といった

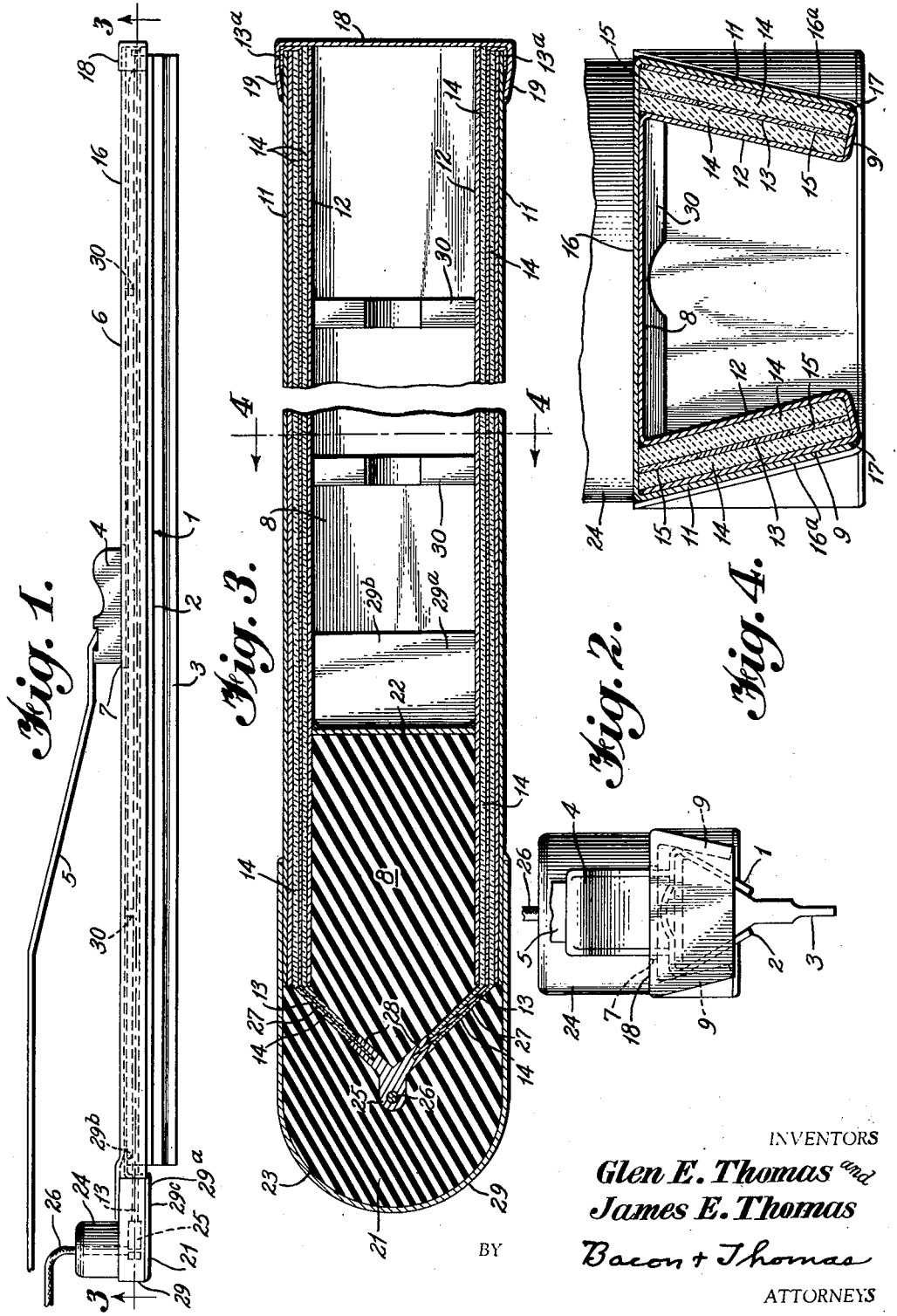

United States Patent Office 2,703,902
Patented Mar. 15, 1955

2,703,902
DE-ICER FOR WINDSHIELD WIPER BLADES

Glen E. Thomas and James E. Thomas, Marion, Ohio

Application July 30, 1952, Serial No. 301,669

7 Claims. (Cl. 15—250.5)

This invention relates to new and useful improvements in windshield wipers, and more particularly to an attachment for a windshield wiper blade embodying heating means for removing ice and snow from the windshield during inclement weather conditions.

In the operation of conventional automobile windshield wipers, while driving through winter sleet and snowstorms, ice rapidly builds up on the windshield despite the use of a car heater and a windshield defroster inside the car blowing heated air over the inner surface of the windshield. This icing phenomenon results because the windshield defroster inside the car heats the windshield above the melting point of the snow and ice, and then as the water from the snow and ice is being wiped off the windshield, it comes into contact with the metal frame around the wiper blade which immediately chills the water and freezes it into ice again. This condition, plus the possible addition of snow sticking to the wiper blade, causes the ice to grow rapidly until it reaches the point where the ice gets under the blade, that is, between the blade and the windshield itself. As soon as this condition exists, the ice forms even faster on the blade, as there is now an air space formed between the ice on the blade and the windshield, which accelerates freezing. Any water present on the windshield is no longer being rapidly removed, and is itself frozen by the stream of subfreezing air into which the car is moving. The result is that the now solidly frozen wiper blade scrapes over the surface of the ice on the windshield and in time becomes solidly frozen thereto, rendering it completely useless.

The windshield of an automobile which has been standing in a winter rain or sleet storm becomes thickly encrusted with ice, and the usual manner of removing such ice is to scrape it off with a hand-operated scraper, thereby cleaning the windshield as well as freeing the wiper itself. Whereas it is possible to remove ice and snow from a windshield through the use of a windshield defroster inside the car, such a procedure is quite time-consuming, since such defrosters do not provide sufficiently hot air to be effective until after the engine warms up, and even then, the windshield will ice up again soon after the car is driven in very cold weather.

It is the principal object of this invention to provide a heater which may be combined with a conventional or suitable windshield wiper blade to prevent a windshield from icing and obstructing vision, regardless of weather conditions.

It is a further object of this invention to provide a heater which may be combined with a windshield wiper blade to quickly dissipate any ice and snow which may form or collect on the windshield of a parked car, thereby eliminating the usual scraping operation necessary to remove such ice and snow.

It is a still further object of this invention to provide such a heater in the nature of a unitary, small, light-weight attachment which may be easily and quickly combined with the ordinary windshield wiper blades of existent automobiles.

Other objects and advantages of the invention will become apparent on reference to the following description and drawings, wherein:

Figure 1 is a front elevational view of one of the new type heaters mounted on a conventional windshield wiper blade;

Figure 2 is a side elevation as viewed from the right-hand side of Figure 1;

Figure 3 is a longitudinal section taken on the line 3—3 of Figure 1; and

Figure 4 is a transverse cross-section taken on the line 4—4 of Figure 3.

Referring to the drawings, wherein like numerals designate like parts, the numeral 1 generally refers to a windshield wiper blade having a metal backing or frame 2 and a rubber wiper or squeegee 3. The metal frame 2 has mounted thereon a head 4 which is attached to a blade-operating arm 5.

Detachably mounted over the wiper blade 1 is an elongated inverted substantially box-shaped heater 6 having a rectangular opening 7 in its upper surface to accommodate the head 4 of the wiper blade 1.

The heater 6 comprises an elongated inverted trough or U-shaped casing 8 having converging double side walls 9. The parallel sides 11 and 12 of double walls 9 form upturned receptacles for heating elements 13 and for mica insulation 14 and 15. The heating elements 13 consist of elongated strips of metal which are sandwiched between wide insulating strips 14 along with relatively thin and narrow strips 15 arranged above and below the same, all of the strips preferably being connected together. The composite heating element and insulation assembly fits snugly within the upturned receptacles formed by the double walls 9 of the casing 8.

An elongated inverted U-shaped cover 16 is provided which has legs 16ª fitted tightly over casing 8, with the edges of the legs sealed at 17, as by soldering. The outer end of the assembled casing 8 and cover 16 is provided with an end plate 18 having substantially perpendicular walls 19 on three sides thereof, which walls are adapted to fit snugly over the cover 16. As may best be seen in Figure 3, the heating elements 13 extend beyond the ends of the insulation 14 and casing 8, and are bent back upon themselves as indicated at 13ª to be clamped to the sides 11 of cover 16 by the perpendicular walls 19 of the end plate 18. This grounds one end of the heating elements 13 through the casing 8 and cover 16 by any suitable means, such as soldering.

The inner end of the assembled casing and cover is provided with a distributor head 21 of suitable insulating material such as plastic or hard fiber or rubber. The distributor head 21 comprises a reduced laterally extending portion 22, which fits snugly within the double walls 9 of casing 8, and a rounded end portion 23 which carries a circular upwardly extending boss 24. Within the rounded end portion 23 is embedded a Y-shaped metallic connector 25, which has secured thereto the end of a lead wire 26 which passes vertically upward through boss 24. Inwardly converging passages 27 are provided within distributor head 21 to receive the ends 28 of heating elements 13 and the ends of the insulating strips 14 and 15, the ends 28 being electrically connected to the connector 25. The distributor head is secured within casing 6 by means of a U-shaped strap 29 whose ends are fastened, as by soldering, to the sides 11 of the cover 16. A plate 29ª having a vertical offset formed therein has one end 29ᵇ soldered to the underside of the casing and its other end 29ᶜ soldered to the legs of the strap 29. Thus, the assembled heater is completely weather tight.

The casing 8, cover 16, end plate 18, strap 29 and plate 29ª are all made of thin sheet metal having suitable corrosion resistance, such as copper, brass, or chromium or nickel plated steel. Within the casing 8, there are mounted two or more transverse supports 30 which are centrally notched so as to provide a rack for the frame 2 of the wiper blade which will prevent the blade from rocking within the casing. The double walls 9 converge to further prevent such rocking and to removably retain the wiper blade within the heater. The walls 9 are fairly flexible and are adapted to be slightly sprung apart to enable the blade 1 to be snapped into place within the casing 8, thus eliminating the need for fastening elements.

To install the unit, the wiper blade 1 is disconnected from the operating arm 5 and the blade is slipped into the casing 8 between the walls 9, with the head 4 of the blade extending through the opening 7. The walls 9 retain the blade 1 in the casing 8 and blade and heater are then placed back on the operating arm 5 and the lead wire 26 is connected to the negative terminal of the automobile ammeter, the heater circuit being completed through the heater casing and cover and through the operating arm to the body of the automobile. A switch (not shown) is connected in the circuit to control the operation of the heater.

As current is passed through the heating elements 13, they heat up, raising the heater as a whole to a temperature which is slightly hotter than one can stand to hold firmly in one's bare hand. This is sufficient heat to keep any ice from forming on the blade and to keep the windshield clear at all times while the vehicle is in motion; it is also sufficient heat to quickly remove the ice and snow which form on the windshield while the car is parked.

While the foregoing description sets forth the invention in connection with an automobile windshield, it will be understood that the heater may be used with equally good results in connection with the wiping blade elements used on the windshields of railroad engines, airplanes, buses, trucks, and the windows of air port control towers and other buildings. It furthermore will be apparent to those skilled in the art that whereas the disclosed heater has been shown as an auxiliary attachment for existing windshield wiper blades, it could be built integral with the blade itself.

Having thus described the invention, what is claimed as new is:

1. In combination with a windshield wiper blade, a heater comprising an inverted trough-shaped casing having a top wall and double depending side walls, heater elements insulatedly mounted within said side walls, an inverted trough-shaped cover having a top wall and depending side walls, said cover being snugly mounted over said casing with the respective top walls of said cover and said casing contacting one another over substantially their entire inner and outer surfaces respectively, said side walls of said cover depending downwardly along and in contact with the side walls of said casing whereby said heater elements are sealed within said side walls of said casing, a distributor head at one end of said casing, a current distributor within said head electrically connected to said heater elements and an end plate mounted transversely of the other end of said casing and said cover, said wiper blade being releasably mounted within said casing parallel to and between said heater elements.

2. In combination with a windshield wiper blade, a heater comprising an inverted trough-shaped casing having a top wall and U-shaped side walls depending therefrom and converging away from said top wall, heater elements insulatedly mounted within said side walls, an inverted trough-shaped cover having a top wall and depending side walls, said cover being snugly mounted over said casing with the respective top walls of said cover and said casing contacting one another over substantially their entire inner and outer surfaces respectively, said side walls of said cover depending downwardly along and in contact with the side walls of said casing whereby said heater elements are sealed within said side walls of said casing, a distributor head at one end of said casing, a current distributor within said head electrically connected to said heater elements and an end plate mounted transversely of the other end of said casing and said cover, said wiper blade being releasably mounted within said casing parallel to and between said heater elements.

3. In combination with a windshield wiper blade, a heater comprising an inverted trough-shaped casing having a top wall and U-shaped side walls depending therefrom and converging away from said top wall, heater elements insulatedly mounted within said side walls and extending beyond said side walls on both ends thereof, said heater elements being bent back upon themselves over one end of said side walls, an inverted trough-shaped cover having a top wall and depending side walls, said cover being snugly mounted over said casing with the respective top walls of said cover and said casing contacting one another over substantially their entire inner and outer surfaces respectively, said side walls of said cover depending downwardly along and in contact with the side walls of said casing whereby said heater elements are sealed within said side walls of said casing, a distributor head at the other end of said casing, a current distributor within said head electrically connected to said heater elements and an end plate mounted transversely of the said one end of said casing and said cover clamping the bent back portions of said heating elements directly to said cover, said wiper blade being releasably mounted within said casing parallel to and between said heater elements.

4. In combination with a windshield wiper blade having a flexible wiping portion and a metal frame holding said wiping portion, a heater releasedly secured to said blade comprising, a trough-shaped casing having depending, double-walled side members defining enclosed spaces and embracing said metal frame of said windshield wiper blade so as to extend longitudinally of and contact said metal frame on both sides thereof, but terminating short of said flexible wiping portion of said blade; elongated electrical heater elements surrounded by heat conducting insulating material within said enclosed spaces of said members; and means making said enclosed spaces weathertight.

5. In combination with a windshield wiper blade having a flexible wiping portion and a metal frame holding said wiping portion, a heater releasedly secured to said blade comprising, a trough-shaped casing having depending, resilient, double-walled side members defining enclosed spaces and converging toward said wiping portion of said blade to clampingly engage both sides of said metal frame of said blade substantially throughout its length, said side members terminating short of said flexible wiping portion of said blade; elongated electrical heater elements surrounded by heat conducting insulating material within said enclosed spaces of said members; and means making said enclosed spaces weathertight.

6. In combination with a windshield wiper blade having a flexible wiping portion and a metal frame holding said wiping portion, a heater releasedly secured to said blade comprising, a trough-shaped casing having depending, resilient, double-walled side members defining enclosed spaces and converging toward said wiping portion of said blade to clampingly engage both sides of said metal frame of said blade substantially throughout its length, said side members terminating short of said flexible wiping portion of said blade; transverse supports secured within said casing and provided with notches receiving the upper edge of said frame and, with said converging side members, preventing said blade from rocking within said casing; elongated electrical heater elements surrounded by heat conducting insulating material within said enclosed spaces of said members; and means making said enclosed spaces weathertight.

7. In combination with a windshield wiper blade having a flexible wiping portion and a metal frame holding said wiping portion, a heater releasedly secured to said blade comprising, a trough-shaped casing having depending, double-walled side members defining enclosed spaces and embracing said metal frame of said windshield wiper blade so as to extend longitudinally of and contact said metal frame on both sides thereof, but terminating short of said flexible wiping portion of said blade; elongated electrical heater elements surrounded by heat conducting insulating material within said enclosed spaces of said members; a distributor head secured to one end of said casing; a current distributor in said head electrically connected to said heater elements; and means making said enclosed spaces weathertight.

References Cited in the file of this patent

UNITED STATES PATENTS

| Number | Name | Date |
|---|---|---|
| 1,640,887 | Davis | Aug. 30, 1927 |
| 1,665,950 | Dwyer et al. | Apr. 10, 1928 |
| 1,790,544 | Hoover | Jan. 27, 1931 |
| 2,034,880 | Sackett | Mar. 24, 1936 |
| 2,089,357 | Grece | Aug. 10, 1937 |
| 2,322,312 | Osborn | June 22, 1943 |
| 2,416,572 | De Cordova | Feb. 25, 1947 |
| 2,469,791 | Schneider | May 10, 1949 |